Dec. 1, 1959  V. F. FOSTER  2,915,722
PATTERN FOR SLIDER OF POSITION MEASURING TRANSFORMER
Filed May 13, 1957  2 Sheets-Sheet 1
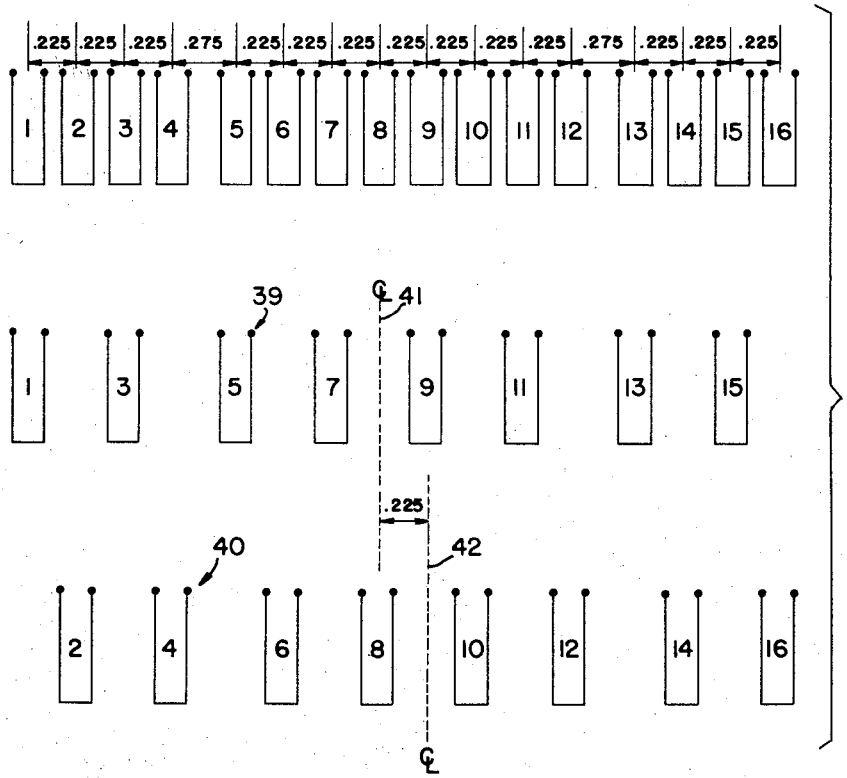
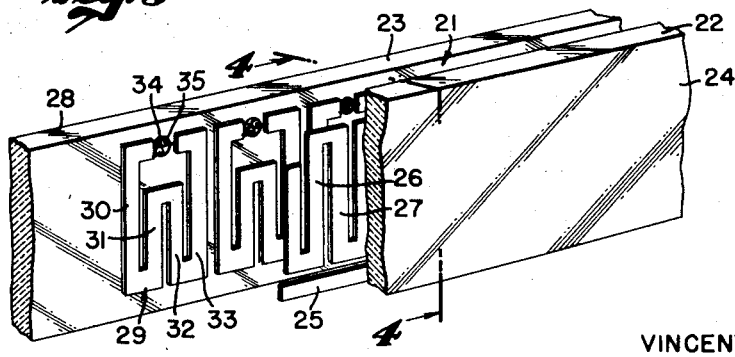
VINCENT F. FOSTER,
INVENTOR.
BY
ATTORNEY.

Dec. 1, 1959  V. F. FOSTER  2,915,722
PATTERN FOR SLIDER OF POSITION MEASURING TRANSFORMER
Filed May 13, 1957  2 Sheets-Sheet 2
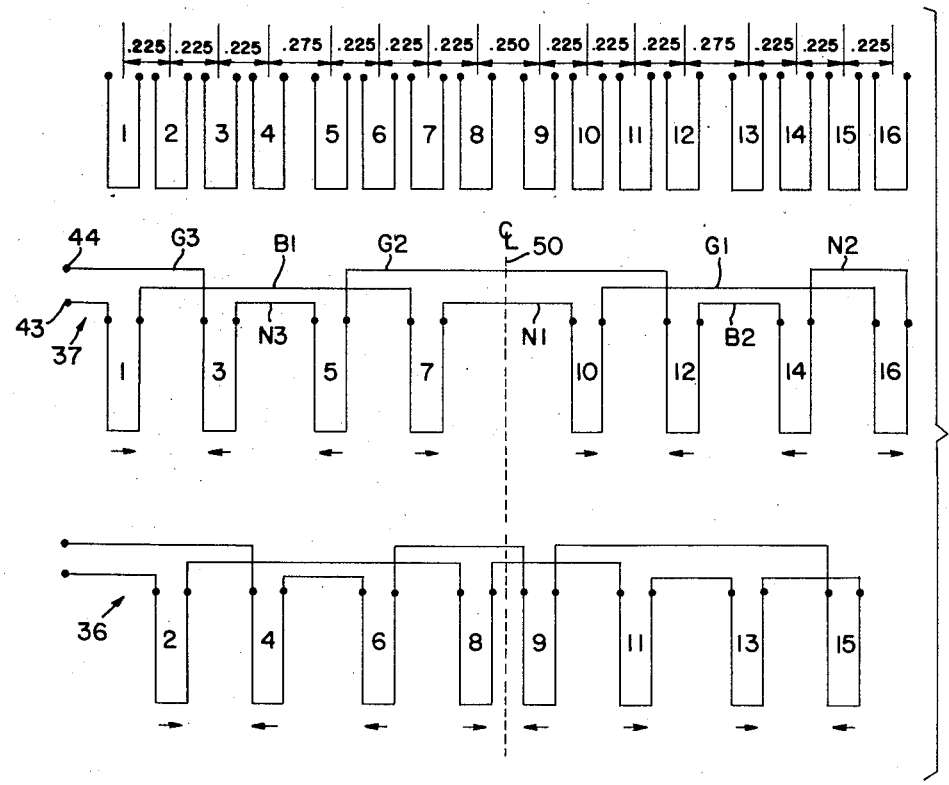
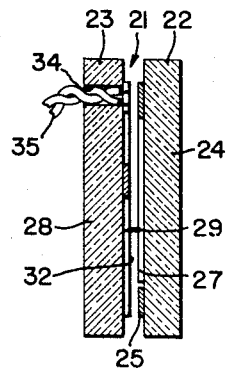
VINCENT F. FOSTER,
*INVENTOR.*
BY *W E Beaty*
*ATTORNEY.*

2,915,722
PATTERN FOR SLIDER OF POSITION MEASURING TRANSFORMER

Vincent F. Foster, New Rochelle, N.Y., assignor to Inductosyn Corporation, Carson City, Nev., a corporation of Nevada Application May 13, 1957, Serial No. 658,578

6 Claims. (Cl. 336—115)

The invention relates to the pattern for the slider of a position measuring transformer wherein one of the members is a scale having a continuous winding, the other member being a relatively movable slider having quadrature windings, the invention providing an improved pattern wherein quadrature shift is avoided or reduced by balancing the quadrature windings about the same center line.

This type of position measuring transformer is described and claimed in Patent 2,799,835, patented July 16, 1957, by Tripp et al. for Position Measuring Transformer, and assigned to the assignee of the present application. The prior patent describes and claims a transformer wherein each of its members comprises an insulating support having thereon a winding wherein the conductors extend transversely to the direction of relative movement of the members. Such transformers may be employed for the general purposes for which resolvers are used. As disclosed in the prior patent, the transformer of this invention preferably has an air core and a series arrangement of conductors having one pole per conductor. As disclosed and claimed in the prior patent, one turn loop coupling may be avoided or reduced by arranging the spacing and the connection of the conductors so that the current flow in one-half of the conductor groups is in a direction lengthwise of the support opposite to the direction of current flow of the remaining groups. That patent, however, discloses an arrangement wherein eight conductor groups are connected together in sequence in the same order as their physical arrangement on the support whereby the conductor group at one end of the arrangement is connected to a terminal at one end of the current path, the conductor group at the other end of the arrangement being connected to the other terminal by a connecting lead which extends lengthwise of the group. It has been found that this results in an unwanted capacity coupling between the two quadrature windings of one transformer member and the continuous winding of the other member. As the functioning of this type of device depends upon magnetic coupling, it is desirable to maintain a favorable ratio of magnetic coupling to capacity coupling and the improvement in reducing the amount of this capacity coupling is described and claimed in application S.N. 624,057 filed Nov. 23, 1956, for Wiring for Slider of Position Measuring Transformer.

According to S.N. 624,057, the unwanted capacity is reduced in the same way for each of the quadrature windings, connectors being provided for connecting a portion of the conductor groups of the winding for current flow in one general direction along its support, with other connectors for connecting the remaining conductor groups of the winding for current flow in the opposite direction along its support, the winding having terminal connectors which are connected to adjacent ones of the conductor groups of its winding. More particularly, an even number of conductor groups is provided for each of the quadrature windings, adjacent ones of the conductor groups of each winding being at the opposite ends of the current path, and the conductor groups which are physically adjacent being connected at opposite relative positions of the current path.

While the present invention makes use of the above mentioned improvements, the additional step is taken of preventing quadrature shifts by providing a wiring for the two quadrature windings so that their centers are not separated but instead have the same center line.

For further details of the invention, reference may be made to the drawings wherein, Fig. 1 is an exploded plan view of the wiring of the quadrature windings of a slider according to the prior patent referred to above, the single conductor transformer member not being shown, both windings shown at the bottom of this figure being actually interlaced on the same glass or insulating support, this interlacing and the pole spacing being shown at the top of this figure.

Fig. 2 is a view corresponding to Fig. 1 wherein the connections for the conductor groups are changed so as to balance them on the same center line, while retaining the above mentioned improvements of the prior patent and S.N. 624,057.

Fig. 3 is a perspective view of the relatively movable transformer members, the rear one or slider being shown in Figs. 1 and 2.

Fig. 4 is a sectional view on line 4—4 in Fig. 3.

Referring in detail to the drawings, the transformer 21 in Fig. 3 comprises the relatively movable members 22 and 23 of which the member 23 is a slider and shown in Figs. 1 and 2. The member 22 is referred to as a scale and has an insulating support 24 for a single conductor 25 deposited thereon comprising a winding having conductors like 26 and 27 connected in series and arranged transversely of the direction of relative movement of the members 23 and 22. The slider 23 also has an insulating support 28 having deposited thereon groups of conductors, each group being somewhat in the shape of a W as indicated at 29 and each such group being represented by a U as indicated for each of the odd and even numbered groups 1 to 16 in Figs. 1 and 2. Each group 29 has parallel conductor portions 30, 31, 32 and 33 connected in series at adjacent ends on the support, these conductors being arranged parallel to the conductors 26 and 27 transversely of the direction of movement of slider 23. The transformer 21 has an air core, with one conductor per pole, the showing in Fig. 3 being somewhat exaggerated as the distance from one conductor to the next conductor on each of the members 15 of the order of 1/20".

The support 28 has a series of holes as shown at 34 through which extends connectors 35, see Fig. 4, connected to the outer ends of the conductors like 30 and 33 of a group.

As shown and described in the prior patent there are two separate windings, comprising 8 sectors each, positioned in space quadrature to each other. Actually each adjacent sector is in space quadrature with its neighbor, with the result that odd numbered sectors 1 to 15 comprise one winding indicated at 39 and even numbered sectors the other winding indicated at 40. The overall result of this design is that the center lines 41 and 42 of the two windings are separated by a distance equal to the separation of adjacent sectors, i.e., .225", as shown in Fig. 1.

In cases where a scale is longer or shorter, in pole spacings, than the slider, one effect will be a quadrature shift between windings upon the slider. This is due to the separation of the center lines of the slider windings, so that the relative "growth" or "shrinkage" of the scale to the slider will cause a departure electrically, or in space, of one winding from its quadrature position. In other words, the distance between center lines of .225" will no longer equal 4.5 poles, .5 poles being equivalent to quadrature distance and one pole equals .05". However, this distance of .225" will be equivalent to 4.5 poles plus the error due to scale "growth," or minus the error due to scale "shrinkage." This inequality of winding positions relative to each other is called "quadrature shift."

Fig. 2 shows a wiring to eliminate this effect. Each winding 36 and 37 is balanced about the same center line 50 so that any growth or shrinkage of the scale has the same effect upon both windings 36 and 37, there being no distance between their center lines.

Note that in Fig. 2 adjacent sectors are still in space quadrature with their neighbors, as shown by the distance between their center lines in inches at the top of Fig. 2, with the exception of the center two sectors 8 and 9, which are in-phase in space, being a whole number of poles apart, namely 5 poles .05"×5=.250". This results in sectors 1, 3, 5, 7, 10, 12, 14, 16 belonging to one winding 37, and 2, 4, 6, 8, 9, 11, 13, 15 to the other winding 36.

This wiring still retains the ability to reject the effects of one turn loop couplings, and to reject the effects of non-parallelism of patterns, as well as eliminate effects of capacitance coupling as shown in Fig. 2.

In the prior arrangement according to the prior patent referred to above, as shown in Fig. 1, there was a spacing of 4.5 poles between the center lines of all the adjacent groups from 1 to 16 except between groups 4 and 5 and also between groups 12 and 13 where there was a spacing of 5.5 poles. Also, according to that patent, one terminal was connected to one end of the current path at the left side of group 2 and the current path then proceeded with the even numbered groups connected in sequence in the same order as their array on the support, with current flow in opposite directions lengthwise of the support in adjacent groups, the lead from the left side of group 16 at the other end of the current path extending lengthwise of all of these groups and forming the other terminal, with the result that there was a static potential and substantial capacity between each of the windings 39 and 40 in Fig. 1 and the single winding like 25 on its associated transformer member like the scale 22 in Figs. 3 and 4, the odd numbered groups of the winding 39 being similarly connected together to provide terminals, as described for winding 40. According to the invention S.N. 624,057, this static potential and capacity are reduced in the same way for each of the windings 36 and 37 in Fig. 2 and will be described in connection with winding 37. Following the current path from terminal 40 connected to the left end of conductor group 1, the path proceeds by the conductor marked B1 to the conductor group 7 and then through the conductor marked N1 through the conductor group marked 10 and from conductor marked G1 to conductor group 16, then by conductor N2 to conductor group 14, then by conductor B2 to conductor group 12, then by conductor G2 to conductor group 5, and then by conductor N3 to group 3, and then by conductor G3 to the other terminal 44. In other words, in the old connection shown in Fig. 1, the sequence was 1, 3, 5, 7, 9, 11, 13 and 15 whereas in the new wiring of Fig. 2, the sequence for winding 37 is 1, 7, 10, 16, 14, 12, 5, 3, for winding 36 the sequence is 2, 8, 11, 13, 15, 9, 6, 4. The new arrangement gives a balance of the static potential, as the various pairs of conductor groups, while physically adjacent on the support, are in electrically opposite relative positions; as group 1 in tracing out the above path was the first one in the path while physically adjacent group 3 was the last one. In a similar way, the group 7 is next to the first while 5 is next to the last, both 7 and 5 being again physically adjacent. In a similar way, for winding 36, groups 2 and 4 also 6 and 8 are physically adjacent, yet they are again electrically in relative opposite positioned. Groups 8 and 9, being at the center, again obey this rule. While maintaining reduction of one turn loop coupling as above described, by providing current flow in opposite directions lengthwise of the support as shown by the arrows at the bottom of each of the groups of conductors for windings 36 and 37, this wiring arrangement of Fig. 2 results in scrambling the conductor groups in different order that the order of their arrangement on their insulating support whereby the current conductor groups which carry current in one direction are at opposite relative positions of the current path with respect to the conductor groups carrying current in the opposite direction. The center groups 8 and 9 of winding 36 are more closely spaced than center groups 7 and 10 of winding 37.

In Fig. 2, the notations B, G and N represent different wire colors, for the different wires, such as brown, green and natural respectively, these wires being tightly twisted and No. 29 Formax wire, or other suitable wire.

Various modifications may be made in the invention without departing from the spirit of the following claims.

I claim:

1. A transformer comprising relatively movable primary and secondary members having an air core, one of said members having an insulating support having thereon a winding having conductors connected in series for current flow in opposite directions transversely of the direction of said relative movement and having one conductor per pole and a pole cycle of two poles, the other of said members having an insulating support having thereon two windings arranged in space quadrature of said pole cycle, each of said quadrature windings having a plurality of conductor groups each having conductors connected at adjacent ends in series for current flow in opposite directions transversely of said direction of relative movement and means for reducing the capacity coupling between the winding of one of said members and the quadrature windings of the other member, said means comprising separate end connectors for connecting a portion of the conductor groups of each of said quadrature windings for current flow in a path in one general direction along its support and other connectors for separately connecting the remaining conductor groups of each of said quadrature windings for current flow in the opposite direction along said path, each of said quadrature windings having terminal connectors connected to adjacent ones of the conductor groups of its winding, the conductor groups carrying current in one direction for each winding being at opposite relative positions of the current path for its winding with respect to its corresponding conductor groups carrying current in the opposite direction, each of said quadrature windings having an even number of conductor groups, with the center groups of one winding more closely spaced than the center groups of the other quadrature winding, the conductor groups of both of said quadrature windings being arranged on opposite sides of the same center line.

2. A transformer comprising relatively movable primary and secondary members having an air core, one of said members having an insulating support having thereon a winding having conductors connected in series for current flow in opposite directions transversely of the direction of said relative movement and having one conductor per pole and a pole cycle of two poles, the other of said members having an insulating support having thereon two windings arranged in space quadrature of said pole cycle, each of said quadrature windings having a plurality of conductor groups each having conductors connected at adjacent ends in series for current flow in opposite directions transversely of said direction of relative movement and connectors for connecting the groups of each winding for current flow in adjacent groups in opposite directions lengthwise of its said support, the conductor groups carrying current in one direction for each winding being at opposite relative positions of the current path for its winding with respect to its corresponding conductor groups carrying current in the opposite direction with physically adjacent conductor groups being connected at opposite relative positions of the current path and the conductor groups of both of said quadrature windings having the same center line.

3. A transformer member comprising an insulating support having quadrature windings each having a plurality of groups of parallel conductors arranged physically on said support about the same center line in one consecutive order and connectors connecting said groups of each winding electrically in series in a scrambled order with current flow in adjacent groups of each winding in opposite directions of the support.

4. A transformer according to claim 3 wherein said plurality is eight in number for each of said windings and identified for reference as odd numbered and even numbered groups in the consecutive order from 1 to 16, said scrambled order being 1, 7, 10, 16, 14, 12, 5, 3 for one of the said quadrature windings and being 2, 8, 11, 13, 15, 9, 6, 4 for the other of said windings, the terminal groups being the first and last stated in the above mentioned scrambled orders.

5. A transformer comprising relatively movable primary and secondary members, one of said members having an insulating support having thereon a winding having conductors connected in series for current flow in opposite directions transversely of the direction of said relative movement, the other of said members having an insulating support having thereon two spaced phase windings, each of said spaced phase windings having a plurality of conductor groups each having conductors for current flow in opposite directions transversely of said direction of relative movement, said spaced phase windings having a common electrical center.

6. A transformer according to claim 1, each of said quadrature windings having both odd and even numbered groups.

References Cited in the file of this patent

UNITED STATES PATENTS 2,799,835  Tripp ------------------ July 16, 1957